Figure 14:
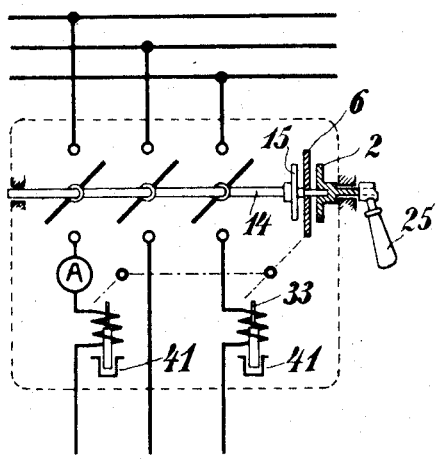

K. HÖHN.
ELECTRIC SWITCH.
APPLICATION FILED JAN. 23, 1917.
1,280,733.
Patented Oct. 8, 1918.
3 SHEETS—SHEET 1.
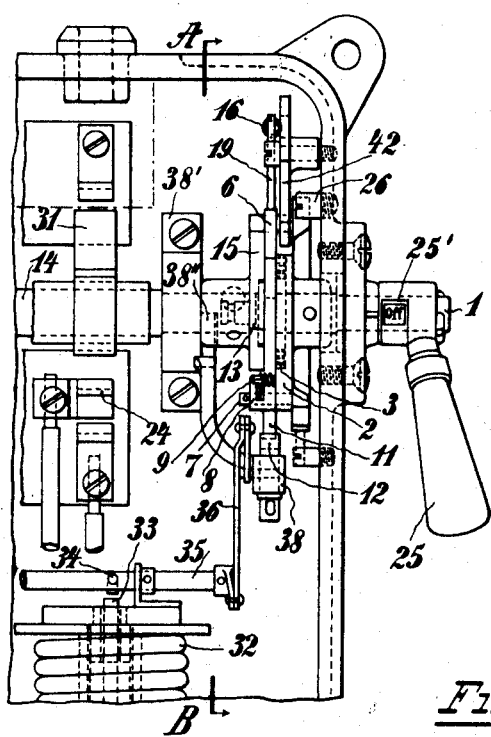
Fig. 1.
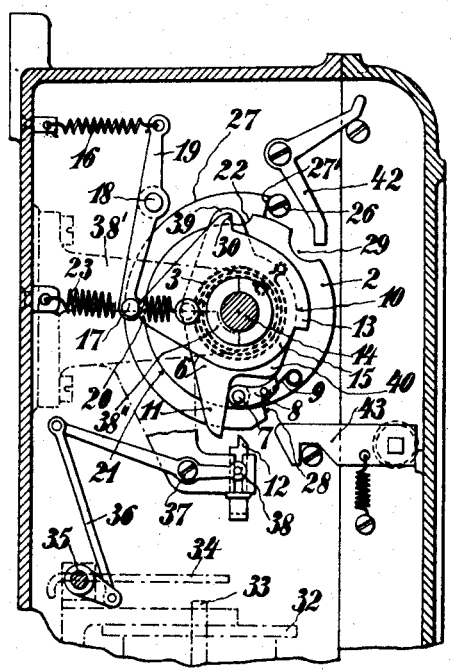
Fig. 2.
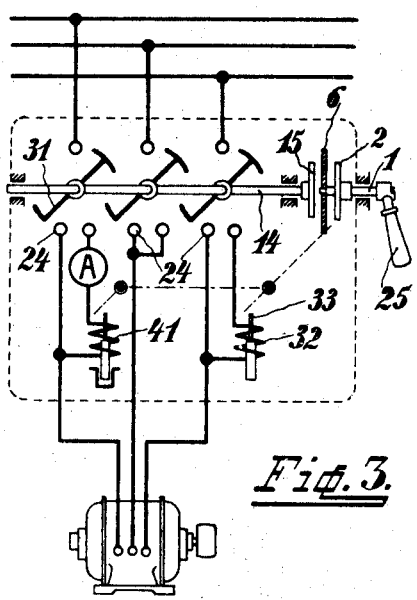
Fig. 3.
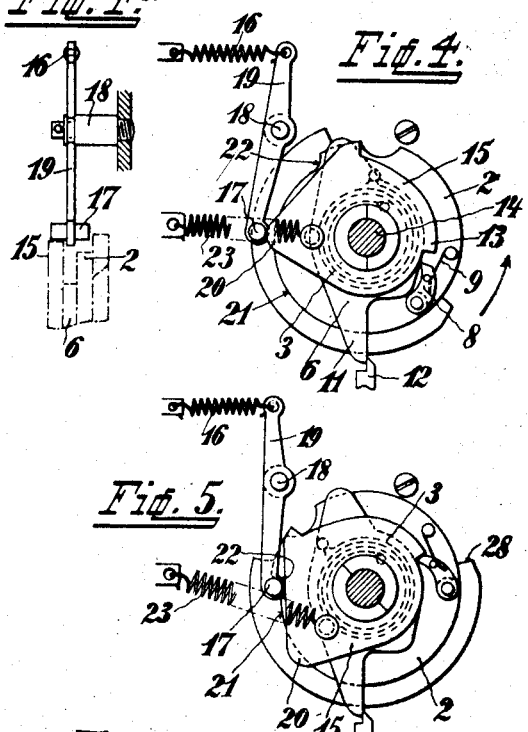
Fig. 4.ᵃ   Fig. 4.   Fig. 5.
Inventor: Karl Höhn
by [signature]
attorney

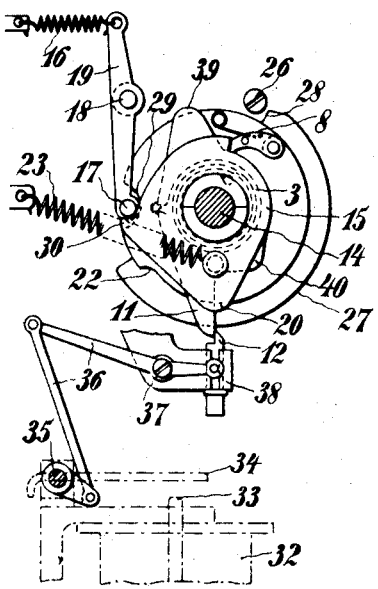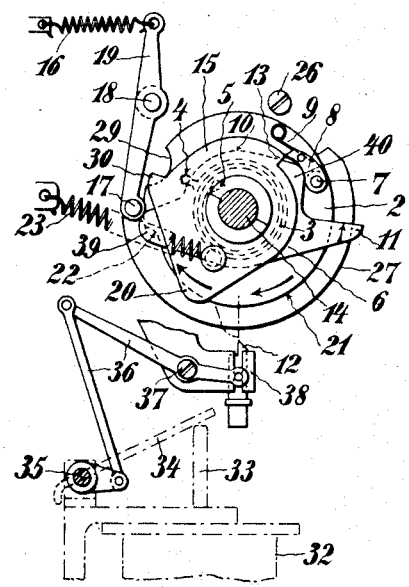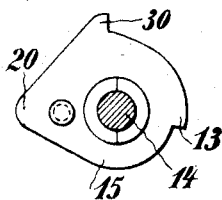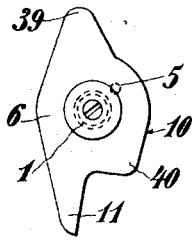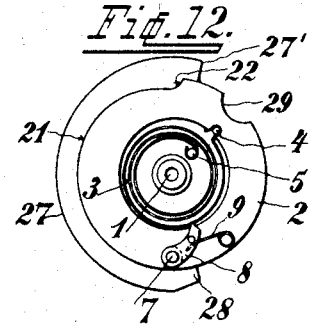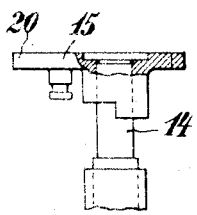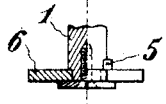

K. HÖHN.
ELECTRIC SWITCH.
APPLICATION FILED JAN. 23, 1917.

1,280,733.

Patented Oct. 8, 1918.
3 SHEETS—SHEET 3.

Inventor:
Karl Höhn
by
attorneys

UNITED STATES PATENT OFFICE.

KARL HÖHN, OF ZURICH, SWITZERLAND.

ELECTRIC SWITCH.

1,280,733.  Specification of Letters Patent.  Patented Oct. 8, 1918.

Application filed January 23, 1917. Serial No. 144,006.

*To all whom it may concern:*

Be it known that I, KARL HÖHN, a citizen of the Swiss Confederation, and residing at Zurich, Switzerland, have invented certain new and useful Improvements in Electric Switches, of which the following is a specification.

The present invention has reference to improvements in electric switches and relates more particularly to an improved releasing mechanism for automatic overload switches, no voltage circuit breakers, lock switches or like devices.

The releasing device can preferably be constructed as a free-wheel release coupling and by reason of its compact arrangement of parts is well adapted for use in small switch boxes, as well as for oil circuit breakers.

As a free-wheel release coupling, this releasing device will also enable the automatic switching off motion to become entirely independent of the manipulation of a switch handle or a hand wheel. Still, when in connection with automatic trip coils, the electric switch can also be opened and closed directly by means of the handle without any necessity of tripping small catches or other mechanism and in exactly the same manner as though it were non-automatic. At the same time, the switch being opened by hand or automatically, the position of the handle always indicates positively whether the switch is opened or closed. Furthermore, upon any abnormal condition taking place in the circuit to which the electric switch is connected, the latter, irrespective of the position of the operating handle, will open in spite of the handle being retained. Consequently with lock switches it would be entirely useless to fix the handle with the intention of stealing current. All this is also of importance with overload circuit breakers, when, after the switch has cut out automatically, it must be thrown in again, with no possibility of knowing whether short circuit, the cause of the switching out, is still existing. With a free-wheel release coupling the switching on can be done without danger, since, in case of existing short circuit, the switch will cut out automatically even during the switching on action.

According to the invention, when closing the circuit, the releasing member, by the aid of a driving member and under the influence of a slightly tensioned spring, is rotated and carried along toward a trigger or stop, which latter can be released by suitable relays, trip-coils or other controlling mechanisms. By continuing the rotary motion of the driving member, the said spring, which is independent of the main spring of the switch shaft, is further tensioned until the switch is suitably locked. Upon the trigger being rendered inoperative, the releasing member, influenced by its spring, will continue to turn in the same direction and uncouple the locking means of the switch, when the main spring will operate to open the switch.

With this design of the releasing member a much smaller amount of energy is needed for automatically releasing the switch, than with many other devices known and consequently the operating magnet can be extraordinarily small and compact.

In order to make my invention more readily understood, I will now describe it in detail with reference to the accompanying drawings, in which—

Figure 15:
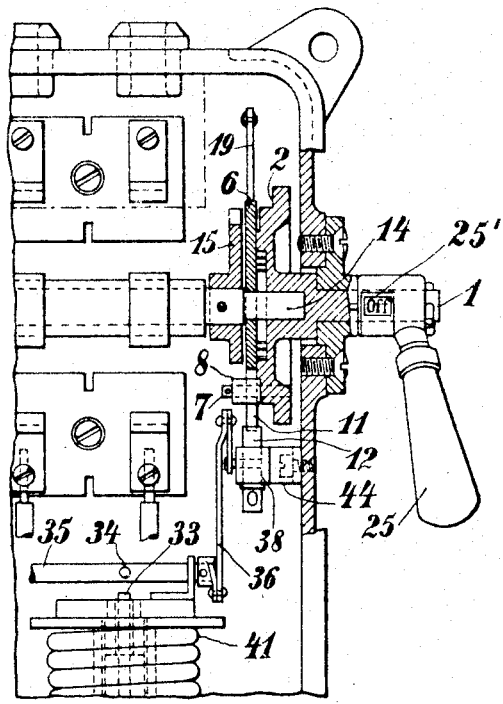
Figure 16:
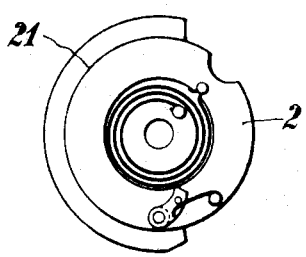
Figure 17:
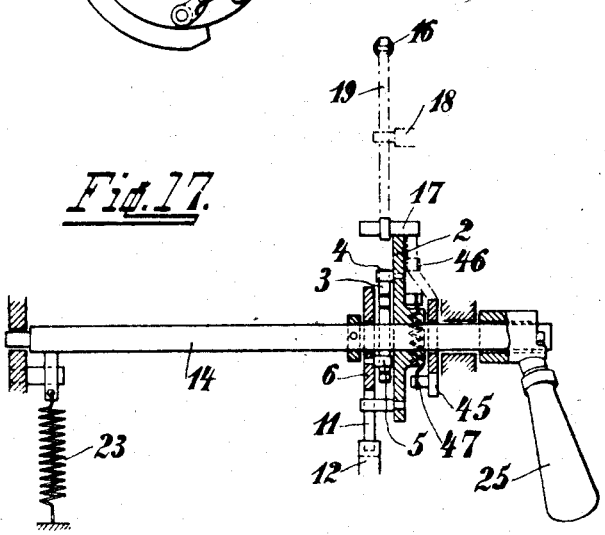
Figure 18:
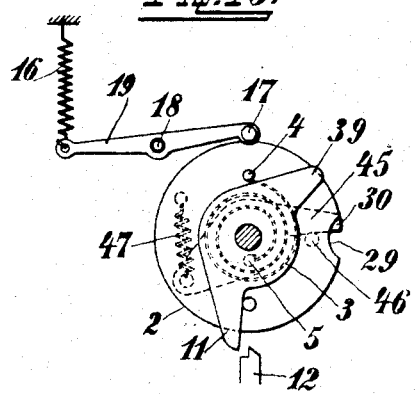

Figure 1 represents a fragmental front elevation of a lockable motor switch box, of the type provided with starting position for operating a three-phase motor with squirrel cage rotor, the hinged door of the switch box being open and the switch in uncoupled "off" position; Fig. 2 shows a section on line A—B of Fig. 1; Fig. 3 is a diagrammatical representation of the electrical and mechanical connections; Figs. 4 and 4ª are respectively a partial front and side elevation of the coupling parts at the beginning of the closing operation; Fig. 5 shows the coupling parts in the intermediate position of the switch and in Fig. 6 they are shown in the end position with the current "on"; Fig. 7 represents the switch parts at the beginning of the automatic cut-out operation, the driving pawl of the driving member just clearing the respective cam portion of the switch plate; Figs. 8-13 show detail-parts to be hereafter fully described; Fig. 14 is another diagram for a switch box with free-wheel release coupling; Fig. 15 is a fragmental front elevation partly in section of a modified construction of contracted design; Fig. 16 shows a somewhat modified construction of the driving member; Fig. 17 is a front elevation, partly in section of a releasing device having a somewhat modified construction of the main operating shaft, and Fig. 18 is a side elevation thereof.

The driving shaft 1 supports a recessed driving member 2 (Figs. 12 and 13) which contains in its recess a coil spring 3, one end of which is fastened at 4 to said recessed member and the other end at 5 to a releasing member 6, (Figs. 10 and 11) which latter rotates freely around the shaft 1. Spring 3, which normally is under slight tension, tends to rotate the releasing member 6 in the direction of the switching-on motion. The driving member is provided with a click or pawl 8, pivoted on the pin 7 and pressed against the circumference 10 of the releasing member 6 by means of a spring 9, which pawl acts at the same time as a stop for the member 6 in the "off" position of the switch (Fig. 2).

When by means of the switch handle 25 the driving shaft 1 and with it the driving member 2 are turned in the direction of the switching-on motion, as indicated by the arrow in Fig. 4, the releasing member 6, influenced by spring 3, follows, until its nose 11 contacts with the trigger 12 (Fig. 4).

The pawl 8 slides along the cam portion 10 of the releasing member 6 and, coöperating with the step 13 of the switch member 15 which is fixed on the switch shaft 14, takes the switch member along and in consequence operates the switch proper.

Influenced by the draw-spring 16 (Fig. 4) a pin or roller member 17, which extends laterally from the lower end of a double armed lever 19, fulcrumed at 18, and extends into the domain of the members 2, 15 and 6, leaves the extremity 20 of the switch member and coöperates with the circumferential face 21 of the member 2. The driving member 2 is provided with a cam hollow 22, which serves to arrest the member 2 at the very moment (Fig. 5) in which the switch 31 couples the starting contacts 24 with the mains (Fig. 3). When the motor has obtained its normal number of revolutions and the high starting current has accordingly decreased, the member 17, (Fig. 5) by a sharp jerk of the switch handle 25 is forced out of the rest 22 and the switch is brought into the normal "on" position, whereby the tension of the springs 23 and 3 is increased.

The switch handle 25 is preferably provided with an indicator or index as at 25' (Fig. 1) to facilitate control of the switch operation.

In case the switching-on operation should not have been carried through completely, the switch handle 25, influenced by the spring 23 returns to the "off" position, when released. In order to prevent the switch from being turned too far, the switch box is provided with a strong stop 26 which coöperates in the respective end position with the rise 28 of the mutilated circular step 27 on the driving member 2.

When, after the switch has been properly thrown, the handle is set free, the parts will remain locked in the "on" position in spite of the action of the springs 3 and 23, since the member 17 has dropped into a notch 29 of the driving member 2 (Figs. 6 and 12) and at the same time has engaged behind the nose 30 of the switch cam disk 15.

By turning back the handle 25, the switch can readily be opened, the member 17 then being forced out of the notch 29 in the driving member 2, which movement in turn causes the member 17 to clear the nose 30 of the cam disk 15.

In order to obtain also sudden interruption, even when switching-off by hand, the switch handle has a certain back-lash relative to the switch.

The switching-off movement of the driving member 2 is limited by the stop 26 and the flat 27' of the rim 27.

The switching-on and switching-off movements of the switching member 15 are limited by a stop 38'' extending from and engaging with the bracket 38', fixed onto the inside of the box-wall.

The automatic releasing operation is the following:

On overload the pin 33 of the instantaneously acting overload relay 32, which latter as shown in Fig. 3 is dead if switch 31 is opened, lifts the lever 34 fixed on the shaft 35 common to the ordinary overload relay 32 and to the slow-acting overload relay or time limit relay 41. With this shaft 35 is connected a system of levers 36, the outer one of which is fulcrumed at 37 and its outer end linked to a trigger device 12, reciprocatingly guided in guide checks 38. Upon the shaft 35 being rotated by the action of the pin 33, the trigger 12 is slid back and thereby disconnected from the nose 11 of the member 6.

The friction between the nose 11 and the trigger 12 is negligible, since the nose 11 is influenced by the weak spring 3 only, while the strong pressure exerted by the spring 23 is taken up by the pivot 18 of lever 19 (Fig. 6), when the switch is in the switched-on position.

The thus freed releasing member 6 under the influence of the spring 3 snaps around in the switching-on direction and its cam portion 39 forces the pin 17 out of the notch 29 and over the nose 30 of the switch member 15, thus liberating said switch member also and allowing switch and switch member 15 with the switch shaft 14 to turn back in the switching-off direction (arrow Fig. 7).

Simultaneously the driving member 2 is taken along by the aid of the pawl 8, until the cam portion 40 of the releasing member 6, which is still rotating in the switching-on direction disengages it from the step 13 of the switch member. The driving member 2 together with the shaft 1 then return into the "off" position, as the weight of the handle causes them to overbalance.

The switch handle 25 could also be carried back by means of a spring, one end of which would have to be secured to a stationary part and the other end to the driving member 2.

The release of the trigger 12, obviously can also be brought about in other ways than by employing the maximum current, for instance by using for this purpose the minimum current, reverse current, no-voltage, or also by employing suitable regulating means, such as current meters, voltage meters, power meters, frequency meters, pressure meters, speed meters, heat meters, clockworks, counters, and the like. The trigger 12 may also be simultaneously influenced by different relays or regulating means.

A simple combination of this kind comprising an instantaneously acting overload relay 32 and an overload relay of inverse delayed action 41 is represented diagrammatically by Fig. 3, where an ammeter A is shown connected in series with the time limit relay 41.

The releasing member 6 serves to disengage the member 17 on the device working as a releasing device only and again serves to uncouple the members 2 and 15 from each other when the device acts also as a free-wheel release coupling.

Obviously in minimum cut-outs where a balance-weight disengages the locking means, the cam portion 39 on the member 6 can be dispensed with.

The releasing member 6 needs not necessarily be arranged between the driving member 2 and the switch member 15. According to the modification shown in Fig. 17, the driving shaft furnished with a handle and the switch shaft are made integral, in which case the device also operates automatically by the aid of relays but it will not, as above described, operate by itself on the handle being held fast.

Still, in order to obtain hand-release in this combination by simply turning the switch handle 25 backward, this can be done by fixing tooth 30 instead of to driving member 2, onto an additional disk member 45 journaled loosely on the shaft 14 (Figs. 17 and 18). On the driving member 2, provided with a notch 29, a pin 46 is fastened, acting as a stop for the member 45 which is influenced by a spring 47 placed between the members 45 and 2.

When from the "off" position (Fig. 18) the driving member 2 is turned in counterclockwise direction, the pin 46 takes along the member 45 until the switch is in its "on" position and fixed therein by the tooth 30 and the locking member 17. In this case the latter also catches into the notch 29 of the member 2. When from the "on" position the driving member 2 is turned in clockwise direction, the tooth 30 of the member 45 remains behind the pin 17 until the latter is forced aside by the notch 29.

Another object of my invention is to make the operations of the switch and that of the door of the switch box interdependent, and a preferred form of such construction is shown in Figs. 1 and 2. In this arrangement the automatic latch 42 effectively prevents careless switching-on with open door, by dropping into the notch 29 of the driving member 2, while on the other hand even a small displacement of the switch handle is sufficient to prevent the opening of the door of the switch box, the path of the latch 43 then being obstructed by the rim 27 of the driving member 2.

In order to reduce as much as possible the dimensions of the switch box, the releasing device may also be designed according to Fig. 15, where the driving member 2 and the handle shaft 1 are shown as integral, and the respective end of the switch shaft 14 operatively extending into the member 2, when the bracket 38' (Figs. 1 and 2) can be dispensed with, the trigger 12 being guided in a bracket 44 extending from the switch box wall.

Since there is, obviously, no use for the cam hollow 22 in switches without starting position, such as last described with reference to Figs. 14 and 15, their driving member 2 (Fig. 16) will not have such hollow 22.

It is evident that the invention is not limited to the constructional details described above, as these may be considerably varied without exceeding the scope of the invention.

What I claim is:

1. In an automatic electrical switch, in combination, a switch shaft, a main spring controlling said shaft, a driving member, a snap releasing member rotatably arranged alongside of said driving member, a normally slightly tensioned spring connected to the driving member and to the releasing member for controlling said releasing member, a trigger adapted to be readily thrown out of function and to hold back said releasing member during the switching-on operation, said second spring, independently of said main shaft spring, tightening on operation of said releasing member, means for locking the switch shaft and the driving member in the switching-on position, said releasing member adapted to continue its rotary movement when said trigger is thrown out of coöperation with said releasing member and to force the locking means out of the locking position by means of said spring, for the purpose of enabling the main shaft spring to force the switch into the switching-off position, means for limiting the switching-on motion and the switching-out motion of the driving member and the switch, and means for causing operative contact between said trigger and said releasing member upon the return of said driving member into the switching-off position.

2. In an automatic electrical switch, in combination, a switch shaft, a main spring controlling said shaft, a driving member, a snap releasing member rotatably arranged on said switch shaft alongside of said driving member and concentrically therewith, a normally slightly tensioned spring connected to the driving member and to the releasing member for controlling said releasing member, a trigger, adapted to be readily thrown out of function and to hold back said releasing member during the switching-on operation, said second spring, independently of said main shaft spring, tightening on operation of said releasing member, means for locking the switch shaft and the driving member in the switching-on position, said releasing member adapted to continue its rotary movement in the switching-on direction when said trigger is thrown out of coöperation with said releasing member and to force the locking means out of the locking position by means of said spring, for the purpose of enabling the main shaft spring to force the switch into the switching-off position, means for limiting the switching-on motion and the switching-out motion of the driving member and the switch, and means, in connection with said driving member, for causing operative contact between said trigger and said releasing member upon the return of said driving member into the switching-off position.

3. In an automatic electrical switch in combination, a switch shaft, a main spring controlling said shaft, a switch member rigidly fixed to said shaft, a driving member, a driving shaft, a snap releasing member rotatably arranged on one of the operating shafts, a normally slightly tensioned spring, connected to the driving member and to the releasing member for controlling said releasing member, a trigger adapted to be readily thrown out of function and to hold back said releasing member during the switching-on operation, said second spring, independently of said main shaft spring, tightening on operation of said releasing member, means on said driving member adapted to take said switch member along when the driving member is moved in the direction of the switching-on motion, means for locking said switch member and said driving member in the switching-on position, said releasing member adapted to continue its rotary movement in the direction of the switching-on motion when said trigger is thrown out of coöperation with said releasing member, means to force the locking means out of the locking position and the switch member to disconnect from the driving member by means of said spring, for the purpose of enabling the main shaft spring to force the switch into the switching-off position in spite of the driving member being retained, means for limiting the switching-on motion and the switching-out motion of the driving member and the switch, means in connection with the driving member for causing operative contact between said trigger and said releasing member upon the return of said driving member into its switching-off position, and means to uncouple said locking means by hand from the locked position.

4. In an automatic electrical switch in combination, a switch shaft, a main spring controlling said shaft, a switch member rigidly fixed to said shaft, a driving member, a driving shaft, a snap releasing member rotatably arranged on one of the operating shafts, a normally slightly tensioned spring connected to the driving member and to the releasing member for controlling said releasing member, a trigger adapted to be readily thrown out of function and to hold back said releasing member during the switching-on operation, said second spring, independently of said main shaft spring, tightening on operation of said releasing member, means on said driving member adapted to take said switch member along when the driving member is moved in the direction of the switching-on motion, means for locking said switch member and said driving member in the switching-on position, said releasing member adapted to continue its rotary movement in the direction of the switching-on motion when said trigger is thrown out of coöperation with said releasing member, means to force the locking means out of the locking position and the switch member to disconnect from the driving member by means of said spring, for the purpose of enabling the main shaft spring to force the switch into the switching-off position in spite of the driving member being retained, means for limiting the switching-on motion and the switching-out motion of the driving member and the switch, means in connection with the driving member for causing operative contact between said trigger and said releasing member upon the return of said driving member into its switching-off position, means for uncoupling the locking means also by hand from its locked position by simply turning back the driving member, a switch handle operatively connected to said driving member with a predetermined back-lash relative to the switch, for the purpose of obtaining momentary interruption of the current on simply throwing back said handle, and means for immediately returning the driving member together with the switch handle into the marked "off" position in case the switching-on movement has not been carried out completely and the handle has been let go.

5. In an automatic electrical switch in combination, a switch shaft, a main spring controlling said shaft, a switch member rigidly fixed to said shaft, a driving member, a driving shaft, a snap releasing member rotatably arranged on one of the operating shafts, a normally slightly tensioned spring connected to the driving member and to the releasing member for controlling said releasing member, controlling devices and a trigger, the latter retaining said releasing member during the switching-on operation, lever means operatively connected to said controlling devices and to said trigger, said second spring, independently of said main shaft spring, tightening on operation of said releasing member, means on said driving member adapted to take said switch member along when the driving member is moved in the direction of the switching-on motion, means for locking said switch member and said driving member in the switching-on position, said releasing member adapted to continue its rotary movement in the direction of the switching-on motion when said trigger is thrown out of coöperation with said releasing member by said controlling devices, means to force the locking means out of the locking position and the switch member to disconnect from the driving member by means of said spring, for the purpose of enabling the main shaft spring to force the switch into the switching-off position in spite of the driving member being retained, means for limiting the switching-on motion and the switching-out motion of the driving member and the switch, means in connection with the driving member for causing operative contact between said trigger and said releasing member upon the return of said driving member into its switching-off position, means for uncoupling the locking means also by hand from their locked position by simply turning back the driving member, a switch box housing all said parts, a switch handle outside said switch box and operatively connected to said inclosed driving member with a predetermined back-lash relative to the switch, for the purpose of obtaining momentary interruption of the current by simply throwing back said handle, means for immediately returning the driving member together with the switch handle into the marked "off" position, in case the switching-on movement has not been carried out completely and the handle has been let go, and means for making the said switch and the switch box door interdependent in their operation.

In testimony whereof I affix my signature in presence of two witnesses.

KARL HÖHN.

Witnesses:
CARL GUBLER,
R. E. SCHOENELD.